Aug. 7, 1951 E. ROTHSCHILD 2,562,991

EGG COOKER

Filed Nov. 2, 1949

INVENTOR.

Eric Rothschild

BY

Harry Radzinsky

ATTORNEY

Patented Aug. 7, 1951

2,562,991

UNITED STATES PATENT OFFICE 2,562,991

EGG COOKER

Eric Rothschild, New York, N. Y.

Application November 2, 1949, Serial No. 125,065

3 Claims. (Cl. 99—329)

1

This invention relates to egg-cooking devices, and more particularly to a type of cooker in which the eggs can be cooked to a required extent without the employment of heated water or other heating fluid. The invention contemplates the provision of a cooker in which the eggs are placed and which will, after a selected and predetermined period of cooking time shut off the flow of heating current to the device and move the cooked eggs to a position where the same may be readily removed from the cooker for consumption.

More particularly, the invention contemplates the provision of a heated chamber closed by a movable cover; of an egg holder maintained in a raised position while the cover is open and automatically forced to lowered position by the descent of the cover, said egg holder when so lowered serving to close electric circuit to heating means for the heating chamber and to means for heating a thermostatic control device which normally holds the egg holder in its lowered and cooking position and until said device is heated sufficiently to permit the egg holder to ascend and raise the cooked egg to a position for removal.

These and other objects to be hereinafter set forth are attained by the invention, a more particular description of which will hereinafter appear and be set forth in the claims appended hereto.

Figure 1:
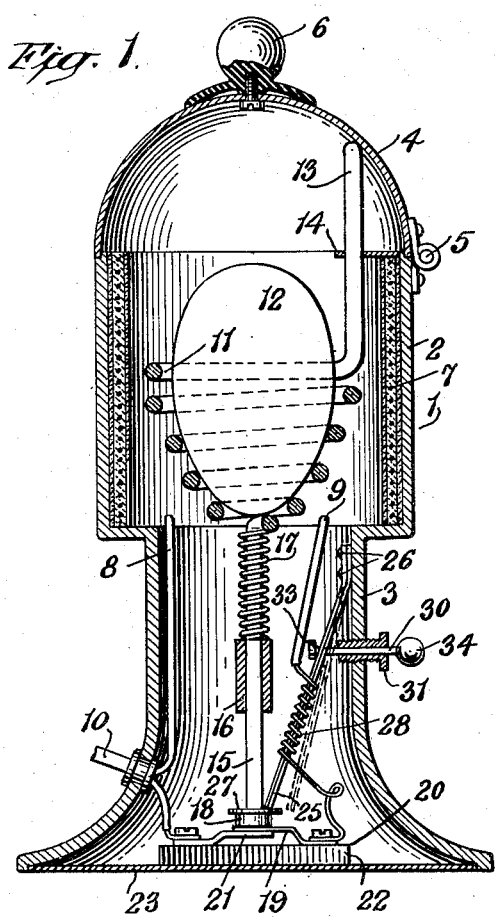
Figure 2:
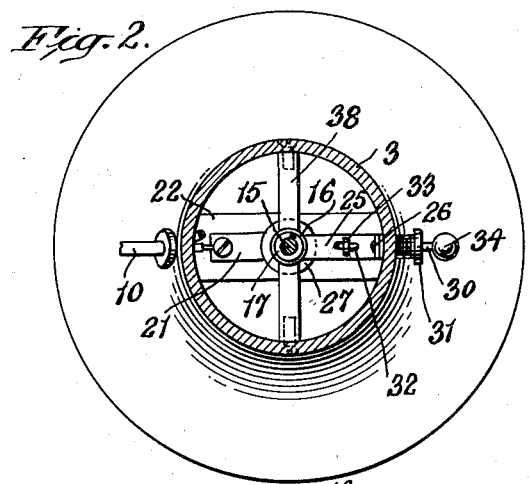
Figure 4:
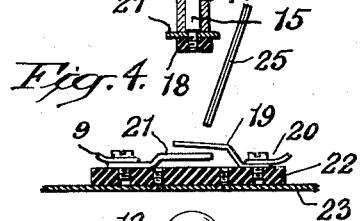
Figure 5:
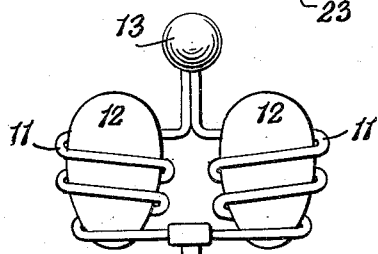
Figure 3:
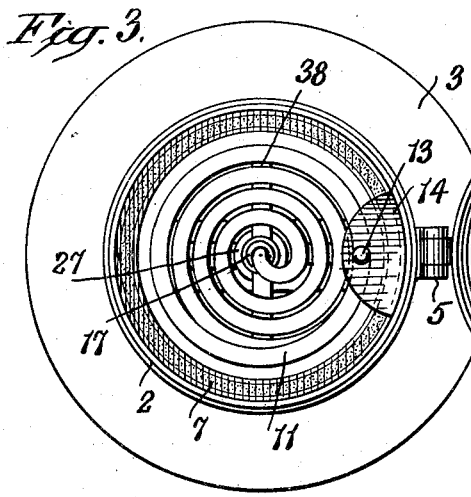

In the accompanying drawing, wherein an illustrative embodiment of the invention is disclosed, Fig. 1 is a vertical sectional view through an egg cooker constructed in accordance with the invention; Fig. 2 is a horizontal sectional view through the lower portion or base part of the device; Fig. 3 is a top plan view of the device, with the cover in open position; Fig. 4 is a sectional view through the bottom of the device showing the switch and associated parts, and Fig. 5 is a view of a holder for several eggs.

Referring to the drawings, I indicates generally the housing of the cooker. The same is preferably, but not necessarily, made of metal and is provided with an upper portion 2 constituting the heating chamber, and a lower portion 3 constituting the base or support. The two portions 2 and 3 may be formed integrally as part of a single casting, or might be separate elements connected together in any other known manner. The top of the heating chamber 2 is adapted to be closed when desired by a cover member 4 preferably of domed formation shown, said cover member being hingedly attached to the top of the heating chamber by a hinge 5 of any conventional type. At the top, the cover member is provided with a handle or knob 6, which is preferably of a heat-insulating nature, permitting it to be handled despite the fact that the cover may be quite hot from the cooking operation.

Contained within the heating chamber is a heating coil 7 of known type, properly electrically insulated from the body of the housing 1, and connected to electrical wiring 8, 9 leading out of the casing and connected to a source of current such as a conventional outlet, through cable 10.

Located within the housing and capable of vertical ascent and descent therein is the egg-holder or basket 11, which, in the form shown in Figs. 1 and 3, is a conical helix of relatively heavy wire or rod and shaped to receive and hold an egg 12 in the manner clearly disclosed in Fig. 1. Said holder 11 is provided with an upstanding upper end, or vertical post 13, guided through an aperture in a lug 14 secured at the upper edge of chamber 2, and having its upper end extending above the same in position for engagement by the inside face of the cover member 4, so that when the cover is manually swung downwardly to its closed position, or that shown in Fig. 1, the cover will force the egg holder 11 and the egg carried thereby to its lowered position in which the egg is located in cooking position within the heating chamber 2.

At its lower end, the egg holder is formed with an integral, downwardly-extending vertical stem 15 which is slidably guided through a boss 16 on a cross member 38 extending across the inside of the base 3. A coil spring 17 surrounds the stem 15 and is located between the boss 16 and the lower portion of the egg holder 11, said spring tending to normally elevate the egg holder to a raised position in which the egg 12 supported by it is at least held partly above the top of the heating chamber 2 and in position to be engaged by the fingers or by a suitable utensil to lift it out of the holder.

At its lower end, the stem 15 is provided with an insulated head 18 constituting a circuit-closing member and adapted to contact with a spring member 19 forming part of a switch 20. Said switch 20 is interposed in the line 9 and includes a lower spring contact member 21 with which the upper spring 19 contacts to close the heating circuit when the egg holder is moved down to its lowered position as seen in Fig. 1. The switch elements 19 and 21 are mounted on a block 22 of insulating material, and the head 18 is also of insulating material. The insulated switch block 22 is mounted on the bottom plate 23 that is secured in and closes the lower end of the base 3 of the housing 1.

The egg holder 11 is maintained in its lowered or cooking position for a predetermined period of time by any suitable timing device, an example thereof being the thermostatic means indicated at 25. This device, in the form shown, consists of a bimetallic strip having its upper end attached, as at 26, to the inner side wall of the base 3 and having its free lower end arranged for engagement with a disk 27 forming an annular shoulder and carried on the stem 15 near its lower end and adjacent to the head 18. This arrangement is such that when the egg holder 11 is forced down to its lowered position by manual closure of the cover 4, the disk 27, constituting a collar or stem 15, will be moved past the springy bimetallic strip 25 which will then spring over the top of the disk 27 and hold its end against the top of the same to maintain the egg holder in its lowered position against the lifting force of the spring 17, as shown in Fig. 1.

When the egg holder 11 is forced downwardly as above described, the head 18 carrier thereby will close contact between the switch elements 19 and 21 and this will close circuit to the heating coil 7 so that the cooking of the egg will begin. At the same time, circuit will also be closed to a thermostat-heating coil 28 extending around the bimetallic strip and electrically, but not thermo-insulated therefrom, so that the heating of said strip will begin. When the thermostatic strip becomes sufficiently heated, it will become flexed, as indicated in dotted lines in Fig. 1 and this flexing movement will cause the lower end of the strip 25 to move over from the top of the disk 27, thus permitting the spring 17 to urge the egg holder to its upward or raised position and elevate the cover 4. The raising movement of the egg holder permits the contact members 19 and 21 to separate, as shown in Fig. 4, and this causes the heating circuit to open, so that current to the heating coil 7 and to the thermostat-heating coil 28 is shut off. The cooked egg may now be removed from its holder 11.

Should it be desirable to manually release the egg holder at any time during the cooking operation, this is done by means of a release member 30, consisting of a rod slidable through an adjustable bushing 31 threadably mounted in the wall of the base member 3 of the housing. The release member 30 extends through an opening 32 in the bimetallic strip 25 and is provided at its inner end with the head 33. At its outer end is provided a knob or other finger-piece 34. By pulling upon the knob or finger-piece 34, the bimetallic strip may be drawn away from the stem 15 and thus disengaged from the disk 27 to allow the spring 17 to urge the egg holder to its raised position whenever it is desired to do so. The bushing 31, being threadable in the wall of the base 3, is used to regulate the timing of the device.

From the foregoing, the operation of the device will be readily understood. When the apparatus is inoperative, the cover is open and the egg holder is in its elevated position. At this time also, the switch 20 is open so that no current is reaching the coils 7 and 28. An egg is deposited in the holder 11 and then the cover is manually swung to closed position. As the cover is closed, it contacts the upper end of the part 13, forcing the egg holder down into the heating chamber. When the egg holder reaches its lowered position, the end of the bimetallic strip 25 will engage over the disk 27 and thus retain the holder in such lowered position. The head 18 on the stem 15, will at this time, bring the two spring switch members 19 and 21 into contact and thus close the circuit to the heating coils 17 and 28 so that the cooking operation will then begin. This continues for a predetermined time, or until the thermostatic bimetallic strip 25 has flexed sufficiently to free its end from engagement over the disk 27. When this occurs, the spring 17 will elevate the egg holder and raise the cover 4 and such movement of the egg holder will open switch 20 and discontinue the flow of current to the heating coils. As the thermostat cools it will straighten to its engaging position, in readiness to engage the disk 27 on the next descent of the egg holder.

While I have herein shown and described a single embodiment of the invention, it is obvious that the same is not to be restricted thereto since numerous changes may be made without departing from the spirit of the invention. For example, while in Figs. 1 and 3 is shown a holder for a single egg, Fig. 5 shows a holder for two eggs and it will be apparent that by changes in size and shape of the heating chamber and the holders, a substantial number of eggs may be simultaneously cooked.

Also, while I show the cooking time as being controlled by the employment of thermostatic means, any other suitable time-controlling device of a different nature may be employed. In addition, while I have shown the thermostatic bimetallic strip as being heated by an encircling coil, it will be apparent that it might also be heated by the heat generated in the heating chamber. It will be clear that these and other changes are contemplated and are considered as being within the scope of the annexed claims.

What I claim is:

1. An egg cooking device comprising, a housing having a lower hollow base portion and an upper cylindrical heating chamber, an egg holder located centrally in the heating chamber and adapted for raising and lowering movement therein, a cover fitting over the top of the heating chamber and hingedly attached thereto, an upward extension on the egg holder in the form of a vertical post in position to be engaged by the cover on its downward movement to thereby cause descent of the egg holder within the heating chamber, the lower end of the egg holder being provided with a vertical centrally located stem, a boss in the base of the housing for guiding said stem in its vertical movement, a spring positioned between said guiding boss and the lower end of the egg holder for exerting a raising force upon the egg holder, a switch located in the base portion and having contact members located below the stem and adapted to be brought into contacting relation by pressure of the end of the stem when the stem is moved downwardly, an electric coil surrounding and heating the heating chamber, the flow of current to said electric heating coil being controlled by said switch, latching means for engaging the stem when the egg holder is moved downwardly to its lowered position, and a heat-responsive device in the form of a bimetal thermostat for releasing said latching means when a predetermined amount of heat is imposed upon said heat-responsive device.

2. An egg-cooking device comprising, a housing having a lower hollow base portion and an upper cylindrical heating chamber, said upper chamber having a surrounding wall carrying a heating coil, an egg holder located centrally in the heating chamber, said egg holder being in the form of a spiral member having a downwardly-extending stem, a guiding element located in the base portion for receiving and guiding said stem to permit the egg holder to have a raising and lowering movement, a cover fitting over the top of the heating chamber and hingedly attached thereto, the spiral member of the egg holder having an upwardly-extending arm projecting above the top of an egg contained in the holder, said arm being disposed in a position to be engaged by the cover on the downward or closing movement of the cover to thereby cause descent of the egg holder within the heating chamber, a spring arranged around the stem and above the guiding element for normally exerting a raising force on the egg holder, a switch located below the stem and adapted to be closed by the end of the stem when the egg holder is moved to its lowered position, said switch controlling the flow of current to the heating coil, latching means in the hollow base portion operative on the stem when the egg holder is in its lowered position, to thereby hold the egg holder in such lowered position, and a heat-responsive device in the form of a bimetal thermostat for releasing the latching means when a predetermined amount of heat is imposed upon said heat responsive device.

3. An egg-cooking device comprising, a housing having a lower hollow base portion and an upper cylindrical heating chamber, said upper chamber having a surrounding wall carrying a heating coil, an egg holder located centrally in the heating chamber, said egg holder being in the form of a spiral member having a downwardly-extending stem, a guiding element located in the base portion for receiving and guiding said stem to permit the egg holder to have a raising and lowering movement, a cover fitting over the top of the heating chamber and hingedly attached thereto, the spiral member of the egg holder having an upwardly-extending arm projecting above the top of an egg contained in the holder, said arm being disposed in a position to be engaged by the cover on the downward or closing movement of the cover to thereby cause descent of the egg holder within the heating chamber, a spring arranged around the stem and above the guiding element for normally exerting a raising force on the egg holder, a switch located below the stem and adapted to be closed by the end of the stem when the egg holder is moved to its lowered position, said switch controlling the flow of current to the heating coil, latching means in the hollow base portion operative on the stem when the egg holder is in its lowered position, to thereby hold the egg holder in such lowered position, a heat-responsive device in the form of a bimetal thermostat comprising a part of said latching means, said thermostat being in the form of a strip attached at one end to the wall of the base portion and having a free other end, the stem carrying a shoulder over which the free end of the thermostat engages when the egg holder is lowered, and adjustable means operative externally of the housing for adjustably positioning the free end of the thermostat with relation to the shoulder.

ERIC ROTHSCHILD.

REFERENCES CITED

The following references are of record in the file of this patent:

UNITED STATES PATENTS

| Number | Name | Date |
|---|---|---|
| 1,272,318 | Rodgers | July 9, 1918 |
| 1,753,740 | Chapin et al. | Apr. 8, 1930 |
| 1,977,454 | Price | Oct. 16, 1934 |
| 2,018,698 | Allen | Oct. 29, 1935 |
| 2,040,649 | Fortes | May 12, 1936 |
| 2,057,741 | Purpura | Oct. 20, 1936 |
| 2,194,859 | Malmquist et al. | Mar. 26, 1940 |
| 2,221,863 | Crane | Nov. 19, 1940 |
| 2,320,347 | Brosseau et al. | June 1, 1943 |
| 2,439,017 | Meyers | Apr. 6, 1948 |
| 2,446,935 | Kreer | Aug. 10, 1948 |
| 2,459,933 | Gomersall | Jan. 25, 1949 |

FOREIGN PATENTS

| Number | Country | Date |
|---|---|---|
| 203,514 | Germany | Oct. 22, 1908 |